(12) United States Patent
Trudeau et al.

(10) Patent No.: US 7,389,994 B2
(45) Date of Patent: Jun. 24, 2008

(54) VEHICLE LEVELING SYSTEM

(75) Inventors: Curtis A. Trudeau, Caledonia, MI (US); Robert D. Sorum, deceased, late of Caledonia MI (US); by Loralye Sorum, legal representative, Sioux City, IA (US)

(73) Assignee: Hadley Products, Grandville, MI (US)

( * ) Notice: Subject to any disclaimer, the term of this patent is extended or adjusted under 35 U.S.C. 154(b) by 0 days.

(21) Appl. No.: 11/766,381

(22) Filed: Jun. 21, 2007

(65) Prior Publication Data

US 2007/0246902 A1    Oct. 25, 2007

Related U.S. Application Data

(63) Continuation of application No. 10/766,422, filed on Jan. 27, 2004, now Pat. No. 7,261,304.

(51) Int. Cl.
*B60G 17/04* (2006.01)

(52) U.S. Cl. ............... 280/6.153; 280/6.157; 280/5.514; 701/37

(58) Field of Classification Search ............... 280/6.153, 280/6.157, 5.5, 5.514, 5.507, 5.508; 701/37
See application file for complete search history.

(56) References Cited

U.S. PATENT DOCUMENTS

| | | | |
|---|---|---|---|
| 3,836,161 A | 9/1974 | Buhl | |
| 3,917,295 A | 11/1975 | Hiruma | |
| 3,917,307 A | 11/1975 | Shoebridge | |
| 4,396,202 A | 8/1983 | Kami et al. | |
| 4,641,843 A | 2/1987 | Morrisroe, Jr. | |
| 4,733,876 A | 3/1988 | Heider et al. | |
| 4,923,210 A | 5/1990 | Heider et al. | |
| 5,229,829 A | 7/1993 | Nihei et al. | |
| 5,913,525 A | 6/1999 | Schneider et al. | |
| 6,050,573 A | 4/2000 | Kunz | |
| 6,098,995 A | 8/2000 | Danis | |
| 6,098,996 A | 8/2000 | Perlot | |
| 6,176,495 B1 | 1/2001 | Decker | |
| 6,502,837 B1 | 1/2003 | Hamilton et al. | |
| 6,584,385 B1 | 6/2003 | Ford et al. | |
| 6,948,722 B2 | 9/2005 | Sproatt et al. | |
| 7,066,474 B2 | 6/2006 | Hiebert et al. | |

*Primary Examiner*—Kevin Hurley
*Assistant Examiner*—Drew J. Brown
(74) *Attorney, Agent, or Firm*—Warner Norcross & Judd LLP (57) ABSTRACT

A vehicle leveling system including at least one level sensor, a controller and an output. The sensor measures how level the vehicle is relative to horizontal. Optionally, it does so dynamically, as the vehicle moves across a potential parking area. The controller analyzes the sensor measurements, and informs the operator via the output whether the vehicle is level in a given direction, whether the vehicle is leveling, whether the vehicle can be leveled at a given location, and/or the "best" leveling that the system is capable of at a location. The system also may automatically level the vehicle relative to the ground for the operator. In one embodiment, the leveling system communicates with an existing vehicle electronic height control system. The leveling system overrides or controls the normal operation of this system, and uses it to level the vehicle, for example, by adjusting the vehicle suspension.

9 Claims, 11 Drawing Sheets

VEHICLE LEVELING SYSTEM

This is a continuation application of U.S. application Ser. No. 10/766,422, filed Jan. 27, 2004 (now U.S. Pat. No. 7,261,304), which is hereby incorporated by reference.

BACKGROUND OF THE INVENTION

The present invention relates to a leveling system for a vehicle.

Many vehicles are equipped with a system that enables an operator to level the vehicle relative to the ground after the vehicle has been parked at an overnight or long term parking location. For example, recreational, camping and coach vehicles are outfitted with a system of jacks. The system includes multiple hydraulic and/or motorized lift or leveling jacks positioned at three or four locations under a vehicle and a control panel in communication with the jacks. By manually and independently operating each of the motorized jacks via the control panel, and simultaneously monitoring the orientation of the vehicle relative to the ground, an operator may level the vehicle at a parking location with the system.

The above jacking system is useful for leveling a vehicle at a long term parking location, however it suffers shortcomings when the vehicle is parked at a short term location. Recreational vehicle operators often stop and temporarily park their vehicles in a parking lot to rest or dine. Such parking lots are usually uneven enough that the parked vehicle is tilted or uneven. This can create unsafe or uncomfortable conditions in and around the vehicle, as well as impair the function of appliances and a lavatory in the vehicle.

Although conventional jacking systems can level the vehicle to correct these conditions, operators are deterred from using the systems for several reasons. First, it takes the operator a significant amount of time to operate and monitor the jacking system when attempting to level the vehicle. Sometimes, the amount of time required to properly level the vehicle can be excessive when compared to the short duration of time the vehicle might be parked. Second, the operator cannot determine whether or not the system can level the vehicle at a given location on the parking lot until after attempting to level the vehicle. This can cause frustration, especially if the operator must move the vehicle several times to find a location that is within the leveling capability of the system. Third, where the parking lot is constructed from tar or asphalt, the jacks of the system dig into these materials and damage the parking lot.

Additional shortcomings of conventional jacking systems are created by its components. The lift or leveling jacks and the control panel of the systems are separate from other operating systems and components of the vehicle. Accordingly, these components must be installed with exacting tolerances and carefully located on the vehicle to prevent interference with or impairment of other vehicle systems, such as the vehicle ride height control system and suspension. The additional components of the system also consume considerable space on or in the vehicle, and needlessly increase the weight of the vehicle. In turn, this reduces the amount of usable space in or on the vehicle, reduces fuel economy, and causes extra wear and tear on the frame and suspension of the vehicle.

One attempt to reduce the number of extra components of conventional jacking systems uses the suspension elements of the vehicle. In particular, this system includes its own air supply, e.g., a compressor that must be installed on the vehicle. In this system, the air lines leading to the suspension elements, or the suspension elements themselves, are outfitted with an additional set of valves that can exhaust air from the suspension elements, or inflate the elements with air supplied by the additional compressor. Because this alternative leveling system modifies the physical features and function of the existing suspension, i.e., by plumbing into the air lines and/or suspension elements with new valves, it frequently voids original equipment manufacturer warranties.

SUMMARY OF THE INVENTION

The aforementioned problems are overcome in the present invention which provides a vehicle leveling system including one or more leveling sensors, a controller and an output device, such as a display. The sensors collect leveling information, e.g., how "level" the vehicle is relative to a horizontal plane. The controller analyzes this information to determine if the vehicle is level in a given direction, e.g., side to side, or front to back, if the vehicle can be leveled at a given location, and/or the "best" leveling that the system is capable of in a given location. The information is output to the vehicle operator.

In one embodiment, the system has dynamic leveling capabilities, that is, it operates and outputs leveling information as the vehicle moves. Accordingly, as the vehicle traverses a potential parking area, the operator can determine where he or she may park the vehicle and be able to level it to his or her satisfaction using the system.

In another embodiment, the system automatically levels the vehicle relative to the ground, e.g, a horizontal plane. This leveling optionally occurs as the vehicle moves across a potential parking area. The controller may also recognize that the system is automatically leveling the vehicle, and output this information to the operator via the display.

In another aspect of the invention, a leveling system communicates with an existing height control system of a vehicle, e.g., an original equipment manufacturer electronic height control system that operates valves to inflate and/or deflate air suspension elements of a vehicle and subsequently modify the vehicle's ride height. The leveling system may integrate itself with the height control system to level the vehicle relative to a horizontal or other plane using the vehicle's own suspension elements, without the need to add components to or modify the hardware of the existing ride height control system.

The leveling system of the present invention offers many benefits. First, with the dynamic leveling capabilities of the system, an operator can easily locate a parking location at which the vehicle may be leveled to the operator's satisfaction. Second, the system can automatically display leveling information while the vehicle is moving and/or level the vehicle for the operator as the vehicle after it is parked. This reduces or eliminates the work usually necessary to level a vehicle, and also reduces the potential for human error in leveling the vehicle. Third, because the system optionally is compatible with a vehicle's existing height control system, additional leveling components, such as jacks, valves and compressors, are unnecessary. Moreover, it is unnecessary to modify the existing height control system air lines valves and suspension elements with additional valves and controls. This reduces the overall cost of the system, reduces installation time, and can in some cases, preserve original equipment manufacturer warranties on the vehicle height control system and/or suspension.

DETAILED DESCRIPTION OF THE INVENTION

I. Overview

Figure 1:
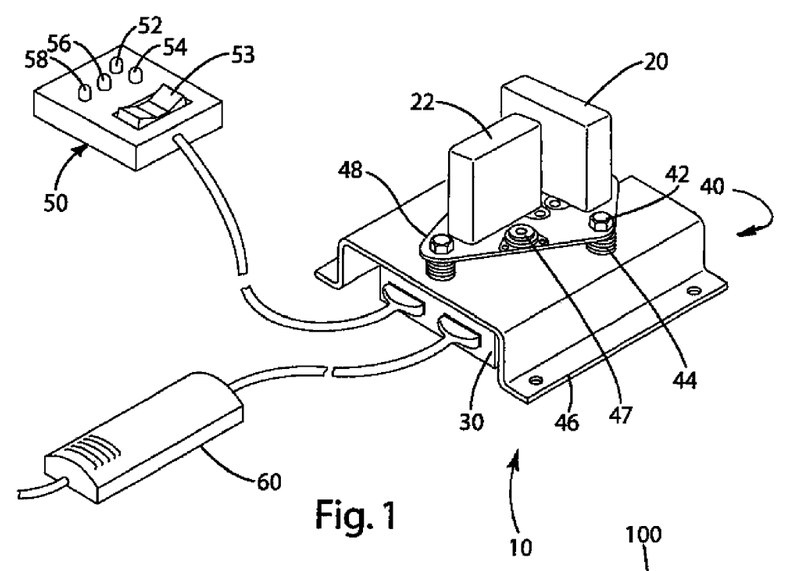
FIG. 1 is a perspective view of the leveling system of the present invention.

A leveling system in accordance with an embodiment of the present invention is shown in FIG. 1 and generally designated 10. The system shown includes a module 40 having inclination sensors 20 and 22, a controller 30 mounted to a bracket 46, and a control panel 50 with display elements 52, 54, 56 and 58. The leveling system shown is integrated with an existing ride height control system of a vehicle. Specifically, the controller 30 interfaces with and is in communication with an electronic ride height controller 60, which is part of an existing ride height control system of a vehicle, e.g., an original equipment manufacturer (OEM) ride height control system, without any physical modification to the system other than coupling to the controller 30. However, the system 10 alternatively may be in communication with and control other conventional mechanical leveling system components (not shown) that are separate from the OEM ride height control system.

Figure 3:
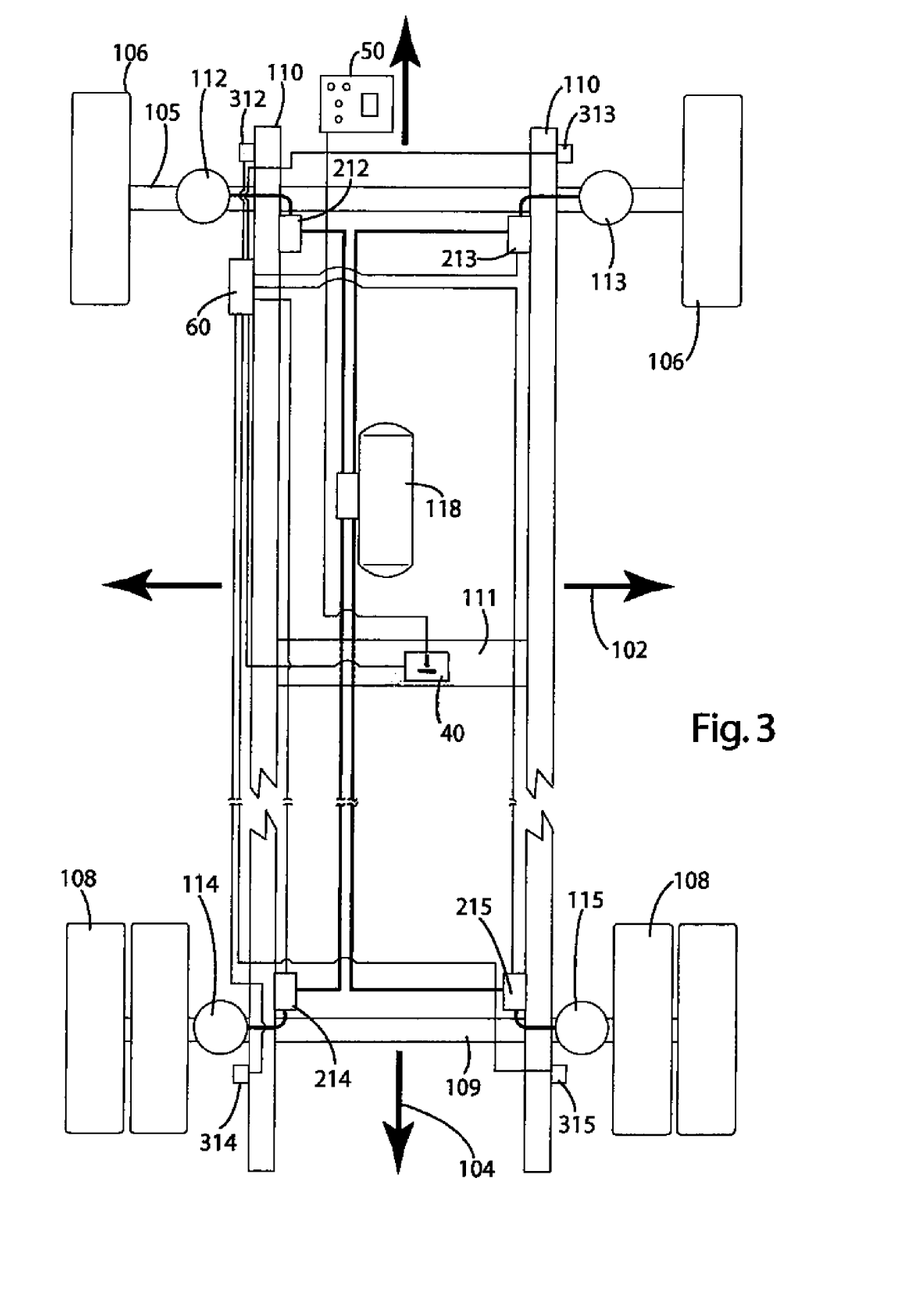
FIG. 3 is a top view of the vehicle with the body removed and the leveling system integrated with a ride height control system of the vehicle.
Figure 4:
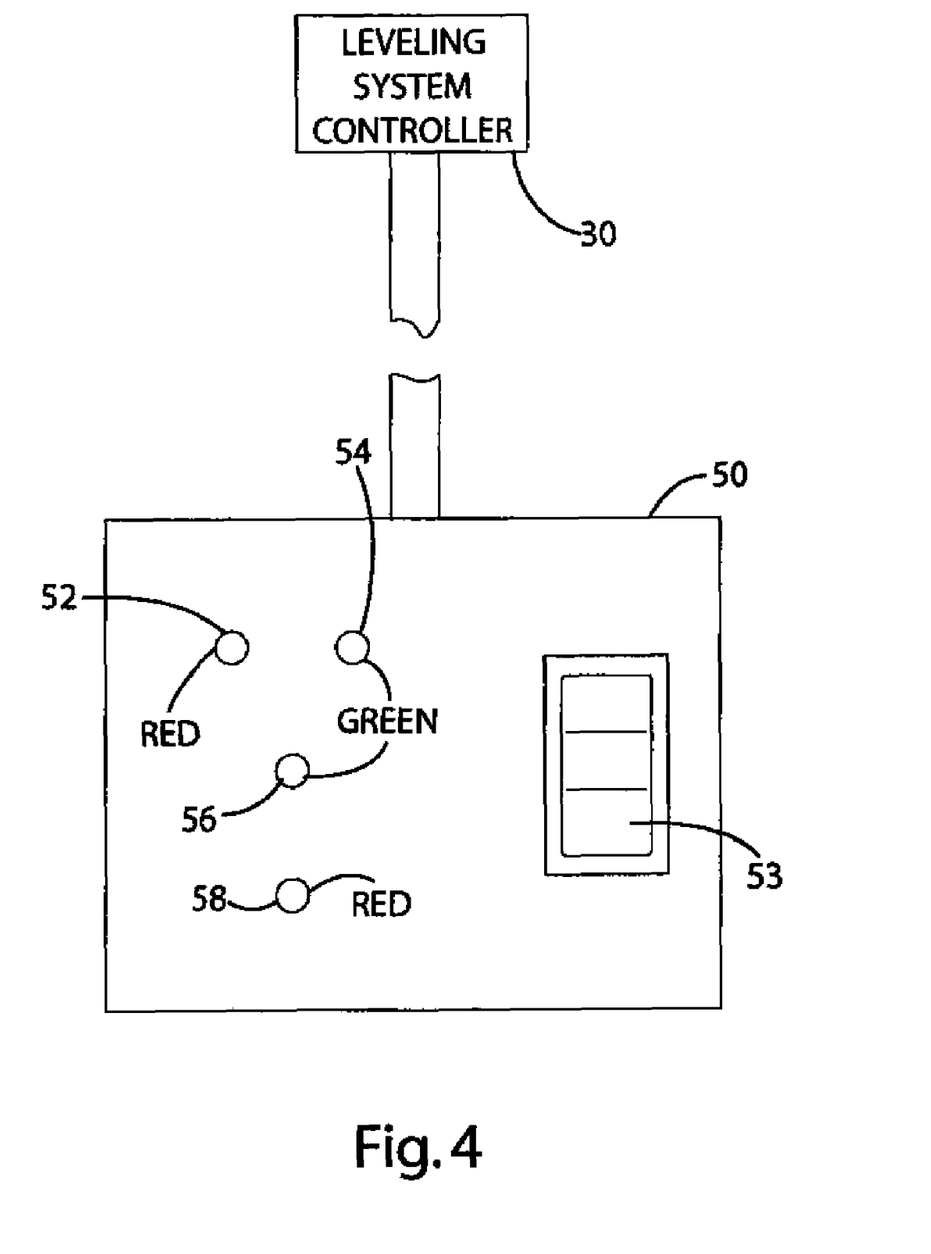
FIG. 4 is a top view of a control panel and display of the leveling system.

In the embodiment shown in FIG. 3, the leveling system controls and/or overrides the existing electronic ride height control system of the vehicle 100 to level the vehicle relative to a horizontal plane or to some other pre-selected plane. In another embodiment, described below, the leveling system 10 dynamically monitors the orientation of the axes of the vehicle relative to a horizontal plane, as the vehicle moves across a potential parking area. The controller 30 analyzes the inclination sensor measurements, and informs the operator via the control panel 50 whether the vehicle is level in a given direction, whether the vehicle is leveling, whether the vehicle can be leveled at a given location, and/or the "best" leveling that the system 10 is capable of at a parking area. The system 10 also may automatically level the vehicle relative to the ground for the operator.

II. Construction

The construction of the components will now be described with reference to FIGS. 1-4. As shown in FIG. 1, the leveling system includes a module 40 including inclination sensors 20 and 22 which are mounted to a plate 48. The inclination sensors 20 and 22 are preferably aligned with side to side vehicle axis 102 and fore to aft vehicle axis 104, respectively, so that the sensors can measure the orientation of these axes relative to a horizontal or other pre-selected plane. The inclination sensors may be aligned with other vehicle axes as desired, however, alignment with the noted axes is well suited to level to horizontal a conventionally suspended vehicle. The inclination sensors shown are Model ATS-50 analog tilt sensors available from Power Components of Midwest, Inc., of Mishawaka, Ind. The actual structure of the sensor may be substituted with any structure that is capable of measuring the orientation of the sensor and generating data representative thereof. Other tilt and/or level sensors capable of measuring an orientation relative to a given plane may be used as desired. These sensors 20 and 22 are further coupled to the controller 30, and are adapted to transfer leveling or angle information, or data representative of such information, actively or passively, to the controller.

The module 40 also includes a plate 48, to which the sensors are secured, that is further mounted via fasteners 42 to the mounting bracket 46. On the plate is a bubble level 47 that may be used to ensure the plate, and thus the sensors 20 and 22 are truly level to a horizontal plane. This bubble level is useful in installing the bracket, and in calibration, it ensures that the sensors are properly set-up. Between the plate 48 and the bracket 46 are springs 44, which bias the plate away from the bracket and enable the plate to angled as desired relative to the bracket. With this construction, even though the bracket 46 may not be level with the horizontal plane when fixedly mounted to a vehicle component, the plate may be adjusted and trued relative to the horizontal plane.

The bracket 46 may be mounted to a vehicle component that is stationary with respect to the vehicle frame or body. The bracket may be mounted with any type of fastener or even welded to a component of a vehicle. Usually, the module 40 is mounted with sensors 20 and 22 face up from the ground. Optionally, a cover (not shown), which covers all the components of the module 40, may be secured to the bracket.

Figure 2:
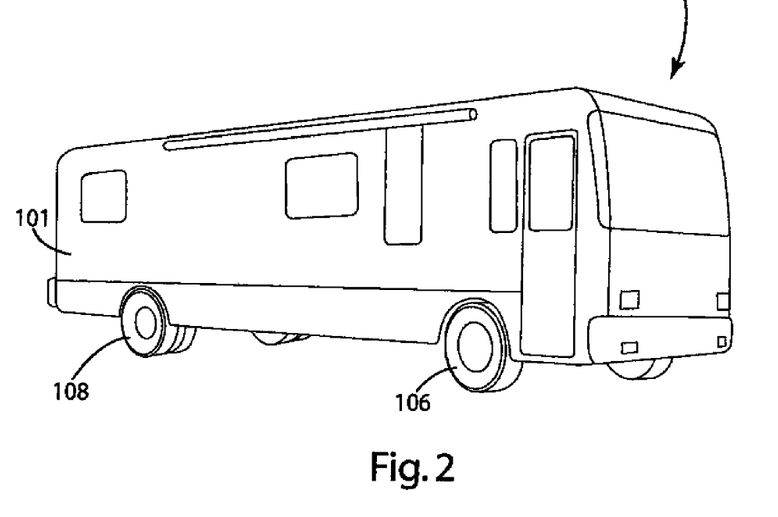
FIG. 2 is a perspective view of a vehicle on which the leveling system is installed.

As shown in FIGS. 2 and 3, the module is mounted to a cross member 111 of a recreational vehicle 100. The vehicle 100 on which the leveling system 10 is installed includes a body 101 that is supported on a frame 110, which is further supported on front wheels 106 and axle 105, and rear wheels 108 and axle 109. Suspension elements 112-115 are disposed between the frame 110 and/or body and the respective axles 105 and 109. It is noted that although the present invention is described in connection with a recreational vehicle, it is well suited for a number of other camping, coach, utility, and passenger vehicles.

FIG. 3 also depicts the existing ride height control system of the vehicle, which controls the suspension elements 112-115 under standard operating conditions, i.e., when the leveling system 10 is not controlling the ride height control system to level the vehicle relative to the ground or some pre-selected plane. The ride height control system is generally conventional, and so will only be described briefly here. The system includes an electronic ride height controller 60, which is in communication with position sensors 312-315 and electronic solenoid-operated air valves 212-215. The solenoid valves are plumbed with air lines to the respective suspension elements, as well as an air pressure pump, compressor or air supply 118.

The position sensors 312-315 as shown are mounted external to the respective suspension elements 112-115. The sensors may alternatively be directly incorporated in the suspension elements 112-115 as desired. The position sensors 312-315 provide output signals to the controller 60 related to the extent of separation of the respective axles 105 and 109 and the frame 110. These sensors may alternatively measure the distance between other separable components of the vehicle as desired, provided the separation gives some indication of the ride height of the vehicle. The output from the sensors is processed by the controller 60 to calculate the ride height of the vehicle. This calculated ride height may be output to an operator, or compared to pre-selected ride heights with the controller 60.

The controller 60 controls the ride height of the vehicle based on operator input and/or the comparison of measured ride height to the pre-selected ride heights. This is done by adjusting one or more pressures within the suspension elements 112-115. More particularly, the controller includes an electronic output circuit to drive output power control for at least one of the solenoid operated valves 212-215, which selectively applies pressure to the respective suspension elements 112-115 to raise the vehicle. The control system also provides an electronic output circuit coupled to at least one of the solenoid-operated air valves 212-215, which releases pressure from selected air suspension elements 112-115 to lower the vehicle. The control system also includes electronic output circuitry to control an air pressure pump, air supply or compressor 118 and subsequently add air to at least one of the suspension elements 112-115 to raise the vehicle. The responses to this adjustment and subsequent movement are monitored by the position sensors 312-315 to ensure proper ride height adjustment.

As an example of how this electronic ride height control system works, the controller 60 measures the ride height in the rear of the vehicle with position sensors 314 and 315. As loading on the vehicle changes due to the presence of a load, passengers, luggage or the like in the rear of the vehicle, the controller 60 determines a difference in a standard or pre-selected ride height. Accordingly, the controller 60 controls the air supply 118 to add pressure to the suspension elements 114-115. This subsequently raises the height of the vehicle body with respect to the rear axle 109, and thus raises the rear of the vehicle in order to re-attain the standard ride height.

Referring to FIGS. 1-4, the leveling system also includes a control panel 50 having an operator control switch 53 and display elements 52, 54, and 56, 58. This control panel is mounted in the cab of the vehicle at the disposal of the operator. The multi-position control switch allows an operator to select between a) a standard ride height controlling mode, within which the operator can select a level find mode or a level search mode, or b) a self leveling mode, as described below. The display elements output information relating to the status of the leveling system 10, as well as the level of the axes 102 and 104 relative to a horizontal or other plane, as described below. The display elements 52 and 54, which are red and green respectively, are indicative of the status of leveling and level with respect to the side to side axis 102, whereas the display elements 56 and 58, which are green and red respectively, are indicative of the status of leveling and level with respect to the fore to aft axis 104. It will be appreciated that the display elements may be replaced with an audible indicator, such as a tone speaker or an electronic voice to update the operator on the operations of the leveling system 10. Moreover, the output of the leveling system 10 may also be integrated into an existing display of the vehicle, for example, an on board, touch sensitive vehicle computer display, and operate in a windows format.

The controller 30 of the leveling system of the present invention will now be described. As shown in FIGS. 1 and 3, the controller is coupled to the control panel 50 and the controller for the ride height control system 60. Although shown as a single controller in the form of an ECU, the controller may be multiple individual controllers for performing specific tasks of the leveling system. For example, one controller may process inclination sensor data, another may control the ride height control system, and yet another may output information to an operator. Alternatively, the controller may be software that is fully integrated into the software of a vehicle control system, for example a ride height control system, so that an additional component for the controller is unnecessary.

In general, the controller 30 monitors or receives data or other input from the inclination sensors 20 and 22, as well as monitors or receives data or other input or information from the ride height control position sensors 312-315, directly or through the ride height control system 60. The controller also provides output signals for displaying the status of the leveling system to the control panel 50, as well as provides output signals, also referred to as leveling information or instructions, to selectively operate the solenoid-valves 212-215 and level the vehicle axes 102, 104 relative to the horizontal plane, thus leveling the vehicle.

The controller may include an EEPROM and/or other non-volatile memory that enables certain constants used during operation to be stored in a memory of the controller, which is optionally programmable. Several such constants stored in the EEPROM are the maximum and minimum height adjustment capabilities of each of the suspension elements.

The controller is powered by the vehicle battery, which in accordance with the exemplary embodiment is a twelve volt positive power source. Ground to the controller 30 and/or controller is provided from the negative vehicle battery terminal.

Figure 5:
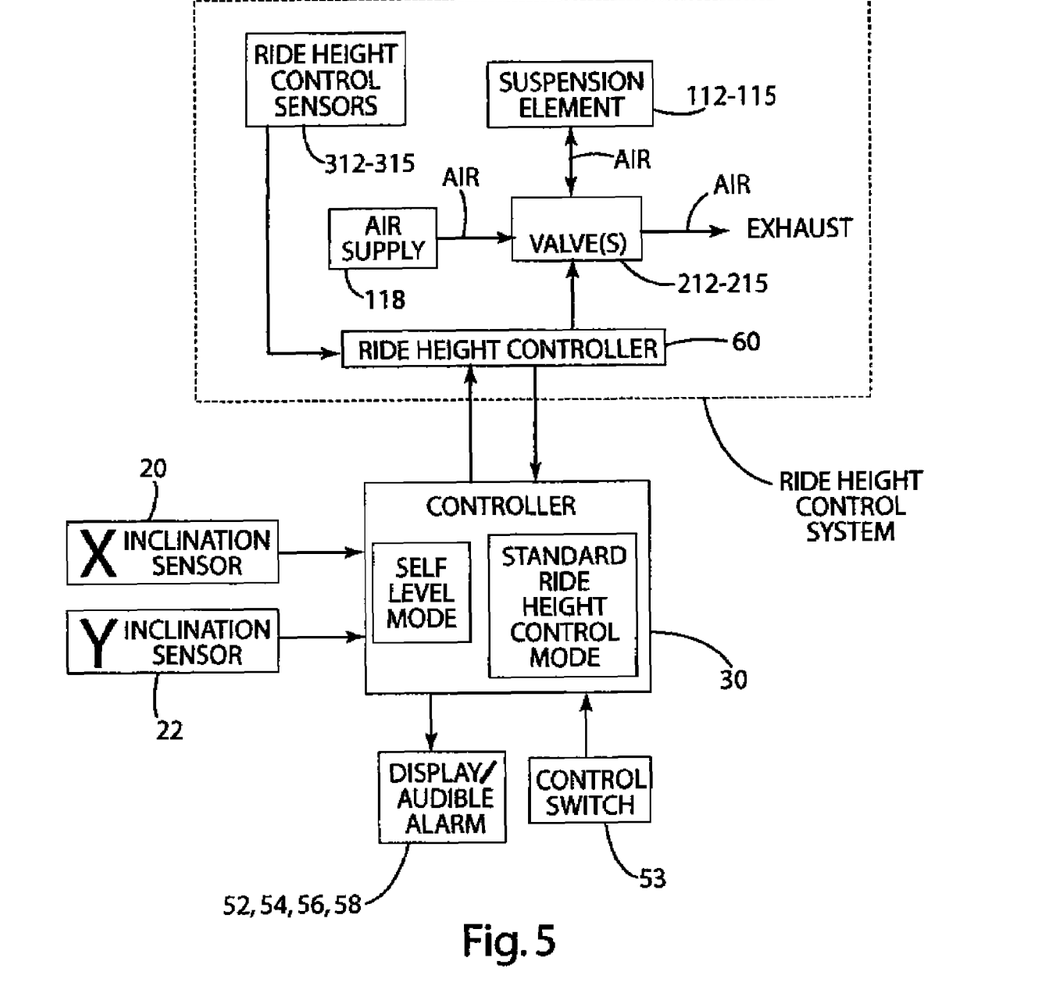
FIG. 5 is a schematic showing operations and components of the leveling system.

FIG. 5 provides a block diagram of the elements of and functions performed by an embodiment of the leveling system. Controller inputs include the inclination sensors, 20, 22, the control switch 53, as well as the existing ride height controller 60, which further provides to the controller input from the ride height control sensors 312-315 of the vehicle. The inclination sensors 20, 22 provide signal input to the controller 30. The sensors have a working range of plus or minus 10 degrees, and will provide the controller 30 with an analog voltage signal from about 0.5 to about 4.5 volts that is proportional to the angle of inclination relative to a horizontal plane. The position sensors 312-315 have an active range of plus or minus 45 degrees, and provide an analog voltage signal in the range from about 0.5 to about 4.5 volts, which is representative of the distance between the axle and the frame. A control switch 53 provides an input to the controller 30 that informs the controller that the operator is selecting either the self level mode, wherein the controller 30 may control the ride height control system, or a standard ride height control, where the controller 30 cannot or is prevented from controlling the ride height control system so that that system operates in a normal ride height controlling capacity, instead of the leveling to horizontal capacity.

The controller 30 incorporates a communications interface with the ride height controller 60 through which it receives calibration as well as active ride height information (described in more detail below). The controller 30 also provides output signals, leveling instructions and information to the ride height controller 60 to energize the electronic valves 212-215 to inflate or deflate the suspension elements 112-115 and subsequently reorient the vehicle axes 102, 104 relative to horizontal. The controller 30 further supplies signals to the display 50 to energize the LED elements 52,54,56 and 58 in a specific manner indicative of whether or not the vehicle axis is level relative to a selected plane, whether or not the vehicle axis is being leveled relative to a selected plane, whether or not the vehicle axis is within a range of potential orientations that will enable the vehicle axis to be leveled relative to the plane, and/or whether or not the vehicle axis is leveled to a tolerance relative to the plane.

II. Operation and Use

The operation and use of the controller and subsequently the leveling system will now be described with reference to FIGS. 6-7. The controller has two primary modes of operation, standard ride height control mode and a self leveling mode. The self leveling mode can be subdivided into a "level find" sub-mode and a "level search" sub-mode. Each of the standard ride height control mode, sub-modes and self leveling mode are initiated by the operator selecting the mode or sub-mode via the control switch 53.

The sub-modes within the self leveling mode begin automatically upon initialization, however, either may be selectively eliminated, modified or delayed as the application requires. In one sub-mode, the level find mode, the controller processes inclination sensor information and outputs this information to the operator via the control 50 to update the operator as to the level status of the vehicle axes. The vehicle may do this dynamically, as the vehicle traverses a potential parking area. In turn, this makes it easier to determine where the operator can park the vehicle and level its axes to horizontal. In another sub-mode, the level search mode, the controller outputs the above information in the same manner, but also controls or overrides the controller 60 of the ride height system to adjust the suspension elements, and if possible, levels the axes of the vehicle relative to the horizontal plane, or adjusts the axes an extent that is as close to being level with the plane as the system is capable of.

Figure 6:
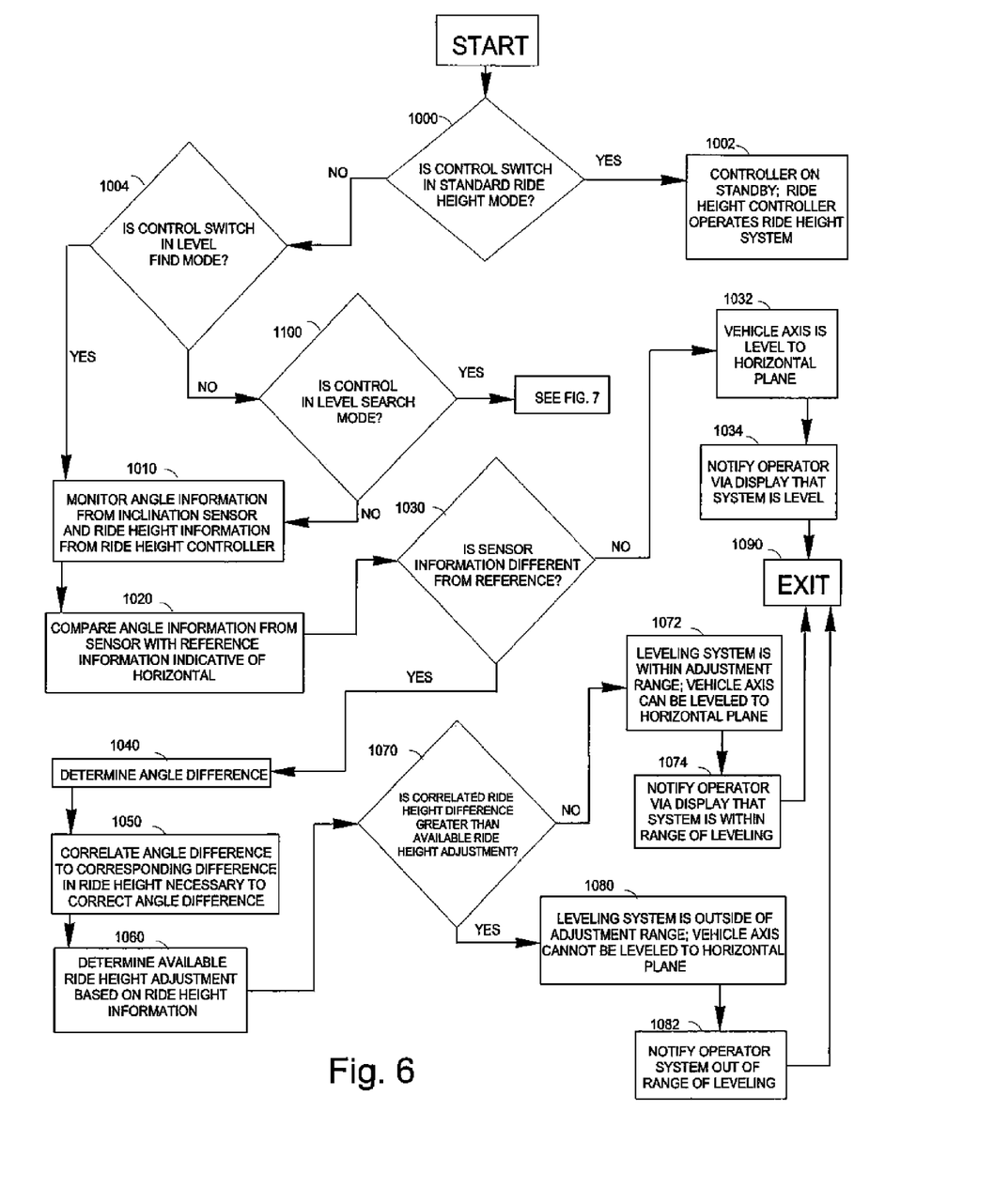
FIG. 6 is a flow chart showing the implementation of functions of the leveling system.

As shown in FIG. 6, the controller first determines the position of the control switch 53, and subsequently determines whether the switch is in the standard ride height mode. If the switch is in the standard ride height mode, then the controller 30 remains on standby as indicated in step 1002, but may continue to receive data from the sensors 20, 22. In this mode, the controller 30 does not control or override the ride height controller 60 to perform operations using the elements of the ride height control system, e.g., the valves 212-215. However, the controller 30 may still receive ride height data from the controller 60 or directly from the ride height control sensors 312-315 as desired. Effectively, in this mode the leveling system 10 is passive, enabling the ride height control system to operate in its normal capacity without being subservient to the controller 30.

If the controller determines that the switch is not in the standard ride height mode, it next determines whether the switch is in the level find mode or level search mode in step 1004. If in the level find mode, the controller 30 monitors the angle information measured by the inclination sensor. In this step 1010, the controller may convert the signals input from an inclination sensor to represent numerical angle information, e.g., angles in degrees. In step 1010, the controller also may monitor the ride height signals obtained from the ride height sensors 312-315, and may convert those signals to represent numerical information, e.g., inches of travel. The measured angle information is compared in step 1020 with stored reference information that represents the angle information when the vehicle axis being monitored is parallel or level with a horizontal or other plane.

The comparison makes the controller query whether or not the measured inclination (angle) information is different from the reference information. If it is not, then the controller determines that the vehicle axis being monitored is parallel to the horizontal plane in step 1032. Based on this determination, the controller outputs signals to the control panel to inform the user that the measured vehicle axis is level relative to the horizontal plane in step 1034. It may do so in a variety of ways, however, in the embodiment including the display of FIG. 4, the controller does so by continuously illuminating a green LED, e.g., 54 and/or 56, depending on the measured axis. It is noted here the controller 30 completes all steps after step 1004 for each axes of the vehicle. After the operator is notified that the vehicle axis is level, it exits from the level find mode. Optionally, however, where one vehicle axis is determined to be level relative to the horizontal plane, but another axis is not, the operator is so informed (as described below). In these circumstances, the operator may desire to move or continue moving the vehicle to find a better location. Accordingly, the previously leveled and indicated level axis will be re-evaluated starting again at step 1010. This may occur a number of times at a given parking location if the location is so uneven that the system is repeatedly incapable of leveling across one or both vehicle axes.

With reference to FIG. 6, if in step 1030, the measured angle information is different from the reference information, the controller determines the angle difference, i.e., the difference in degrees of the measured angle to the reference. Based on the resulting difference, and known operating characteristics of the vehicle suspension elements 112-115, e.g., their maximum travel and ability to vary ride height, step 1050, the controller determines what ride height adjustment is required to level the axis to the horizontal plane, step 1060. This ride height adjustment is representative of the distance, in inches for example, the suspension elements would have to extend or retract to level the sensors, and thus the vehicle, to horizontal. The required ride height adjustment is then compared to the available ride height adjustment in step 1070. If the required ride height adjustment is not greater than the available adjustment, then the ride height control system, in particular the suspension elements, are within an adjustment range that enable the monitored vehicle axis to be leveled to the horizontal plane, i.e., the suspension elements can move enough to level the vehicle given the suspension elements range of potential motion. Thus, in step 1074, the controller 30 activates the control 50 to notify the operator of this situation. In particular, the green LEDs 54 and/or 56 blink quickly to update the operator as to the status of the system. The controller then exits the process. Optionally, however, where one vehicle axis is determined to be within an adjustment range, but another is not, the operator may move the vehicle to find a better parking location. In these circumstances, the previously within adjustment range axis is be re-evaluated starting again at step 1010. This may occur a number of times at a given parking location if the location is uneven enough that system is repeatedly incapable of leveling a vehicle axis, or at least being within a range of adjustment.

If in step 1070 the required ride height adjustment is greater than the available adjustment, then the ride height control system, in particular the suspension elements, are not within an adjustment range, step 1080, that enables the monitored vehicle axis to be leveled to the horizontal plane. Thus, in step 1082, the controller 30 activates the control 50 to notify the operator of this situation. In particular, the red LEDs 52 and/or 58 continuously illuminate to update the operator as to the status of the system. The controller then exits the process. However, if the operator moves or continues to move the vehicle to find a better location, the controller will restart the process from step 1010 to assist the operator.

Referring now to step 1100 in FIGS. 6 and 7, the level search mode will be described. In general, the level search mode incorporates the same steps as the level find mode as indicated. However, the level search mode goes farther than simply assisting the operator in locating a parking location; it does the adjustments to level one or mode axes relative to horizontal plane. Specifically, in those situations where it is determined in step 1120 that the leveling system is within an available ride height adjustment range, the controller informs the operator of this in step 1130 by intermittently illuminating the respective combinations of LEDs 52, 54, 56 and 58.

The controller, in step 1140, then controls or overrides the ride height control system valves to adjust the air pressure or volume in one or more suspension elements to level the axis relative to horizontal. It is noted here that the adjustment of the suspension elements via the controller of the leveling system, without input from the operator regarding such adjustment, is referred to as an automatic adjustment herein. The controller may make adjustments in a variety of ways, for example by lowering a side or end of the vehicle by dumping air from a suspension element as exhaust, or by raising a side or end of the vehicle by inflating the suspension element with air from the air supply, or some combination of these two techniques on different sides or ends of a vehicle.

In one embodiment, the controller implements an exhaust-first technique to passively level the vehicle, using as a starting point the existing capacities of the suspension elements. In this technique the controller determines what adjustment needs to be made. It then sets a preference to first dump air from a suspension element to make the adjustment. Thus, the system can level the vehicle without having to pump air into one or more suspension elements, thereby decreasing adjustment time. If the controller determines that dumping air from a suspension element on one side or end of a vehicle will not level the vehicle axis, it will control the respective valve to inflate a suspension element on an opposite side or end of the vehicle to level the axis to horizontal. It will be noted that the controller may repeat the leveling of an axis one or more times if the leveling of another axis causes the first to become un-level. Indeed, in some cases, the leveling of the axes is an iterative process, where one axis is leveled first, then the other axis is leveled, and then the first axis is re-leveled, and so on until both axes are sufficiently level to the desired plane. During such a process, the angles of the respective axes are measured and re-measured, along with the corresponding ride heights.

In another embodiment, upon beginning the leveling mode, the leveling system 10 first inflates all suspension elements to their maximum capacity. The controller stores the ride height data measured by the ride height sensors, and the inclination data measured by the inclination sensors after inflation. The controller then controls the electronic valves to dump air from the suspension elements. The inclination sensors again measure the inclination data and the controller determines if the vehicle is level. If necessary, the controller does this for several iterations until the vehicle is level across both axes.

In another embodiment, upon beginning the self leveling mode, the controller 30, in communication with controller 60, deflates all the suspension elements to their minimum capacity. The controller stores the ride height data measured by the ride height sensors, and the inclination data measured by the inclination sensors after deflation. The controller then controls the electronic valves to inflate the suspension elements. The inclination sensors again measure the inclination data and the controller determines if the vehicle is level. If necessary, the controller does this for several iterations until the vehicle is level across both axes.

Figure 7:
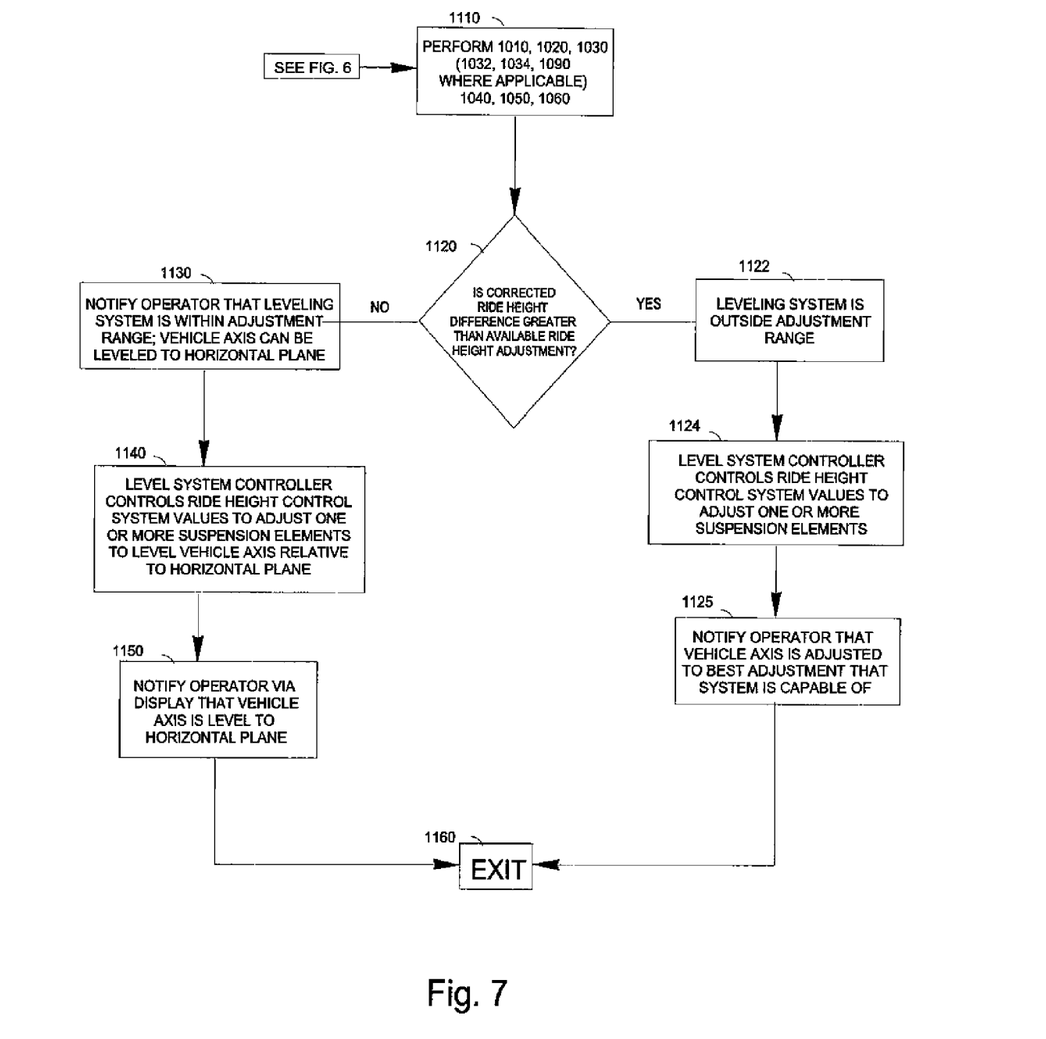
FIG. 7 is a flow chart showing the implementation of functions of the leveling system.
Figure 8:
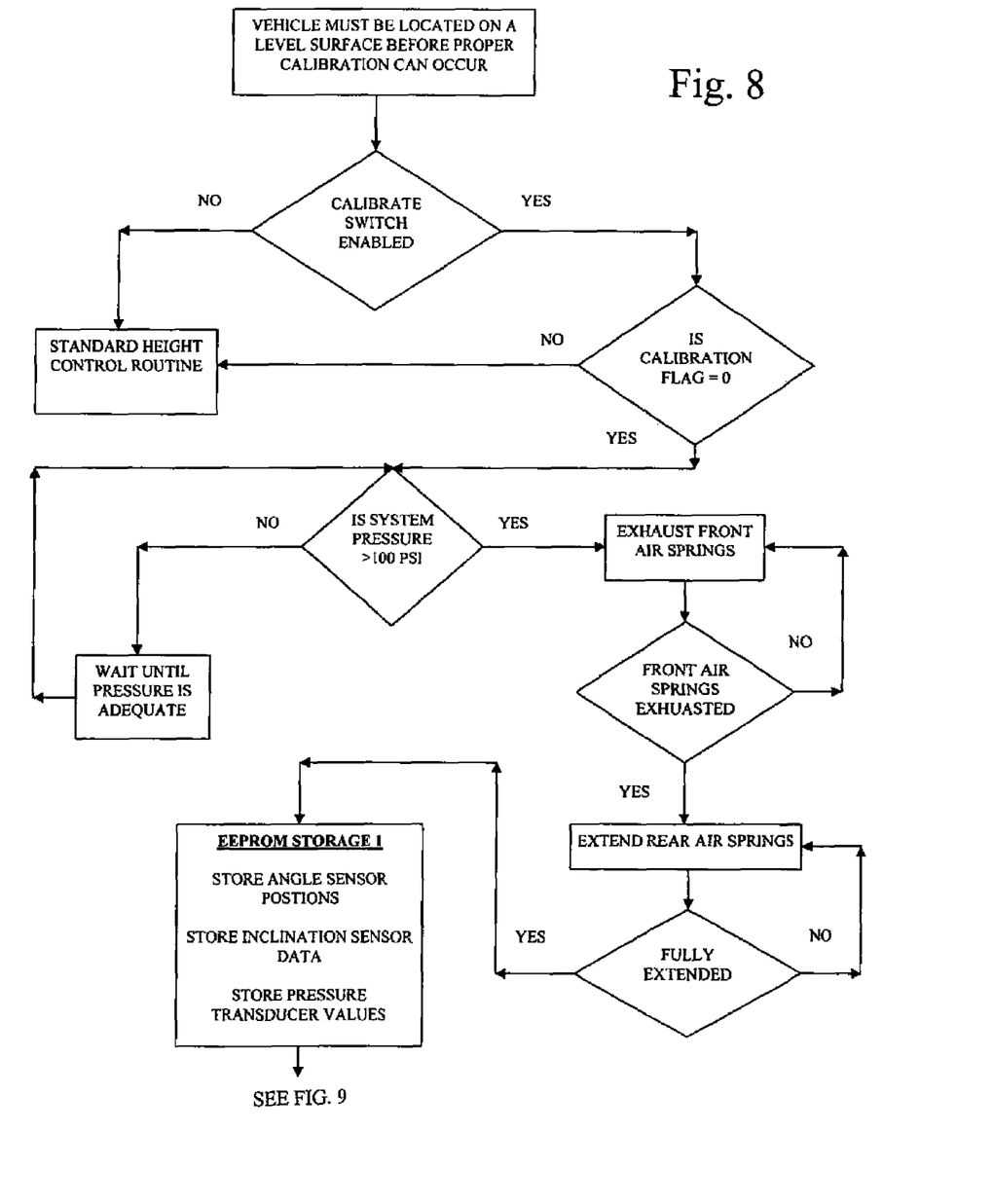
FIGS. 8-12 are a flowchart showing a calibration routine for the leveling system.
Figure 9:
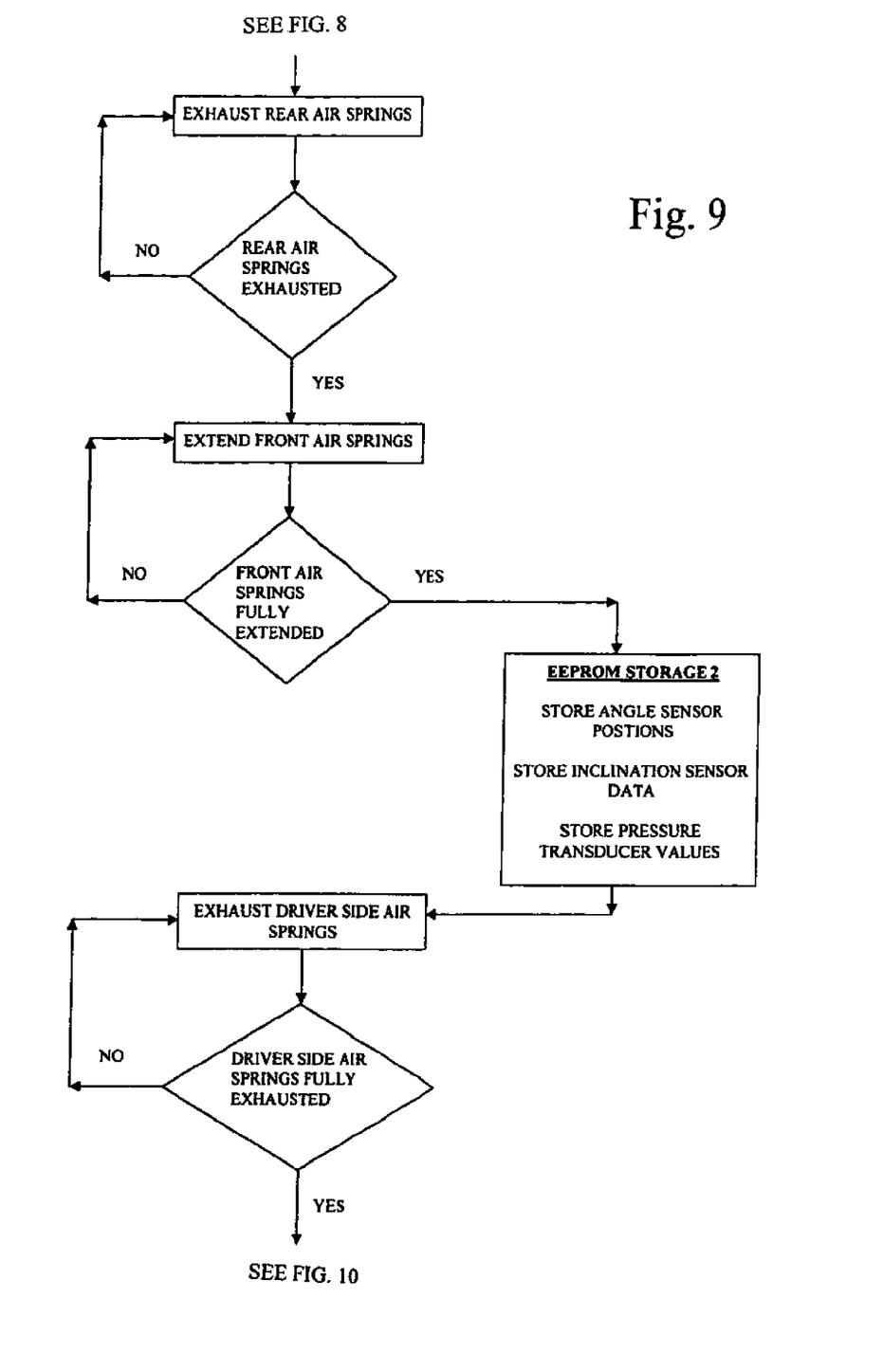
Figure 10:
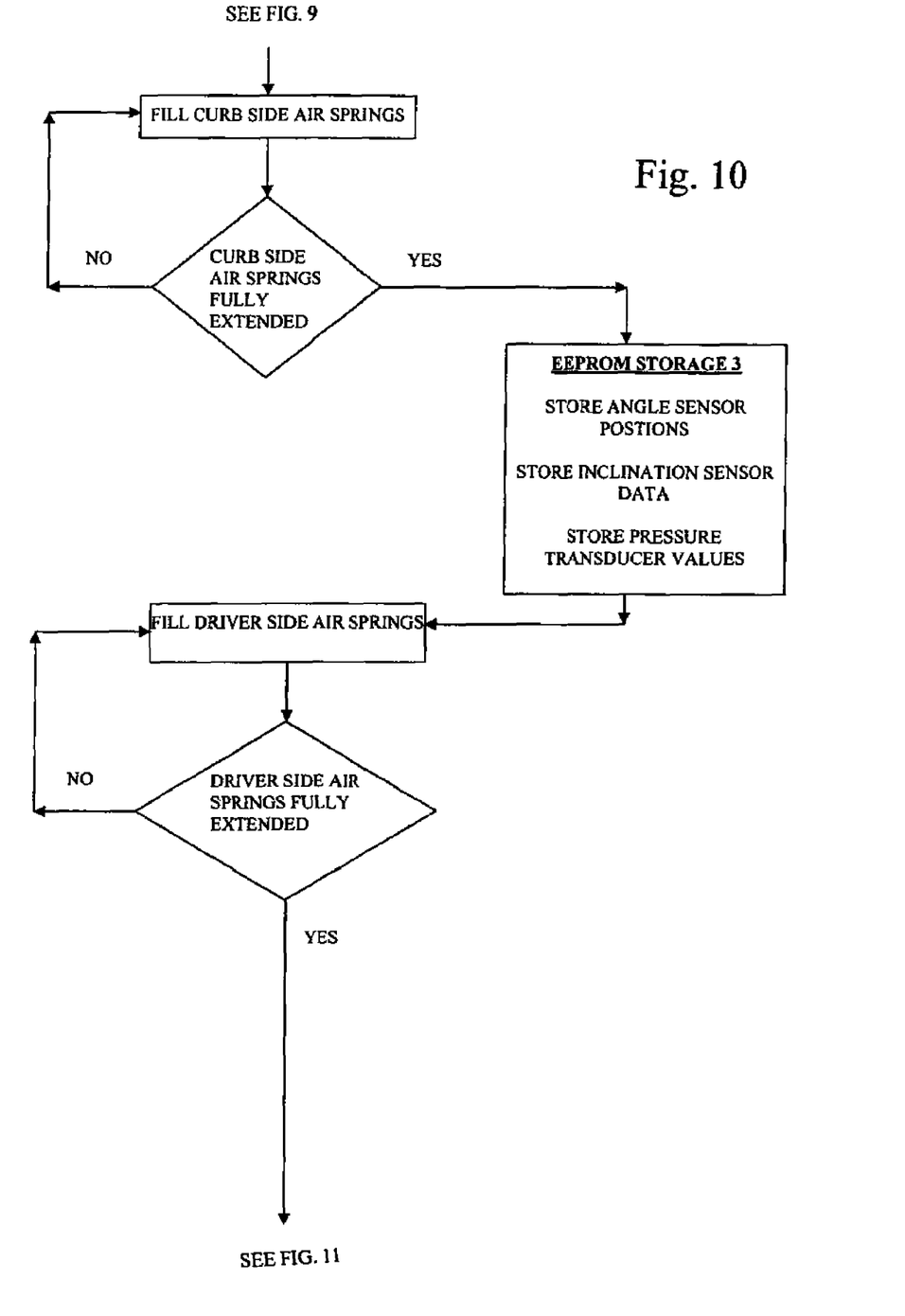
Figure 11:
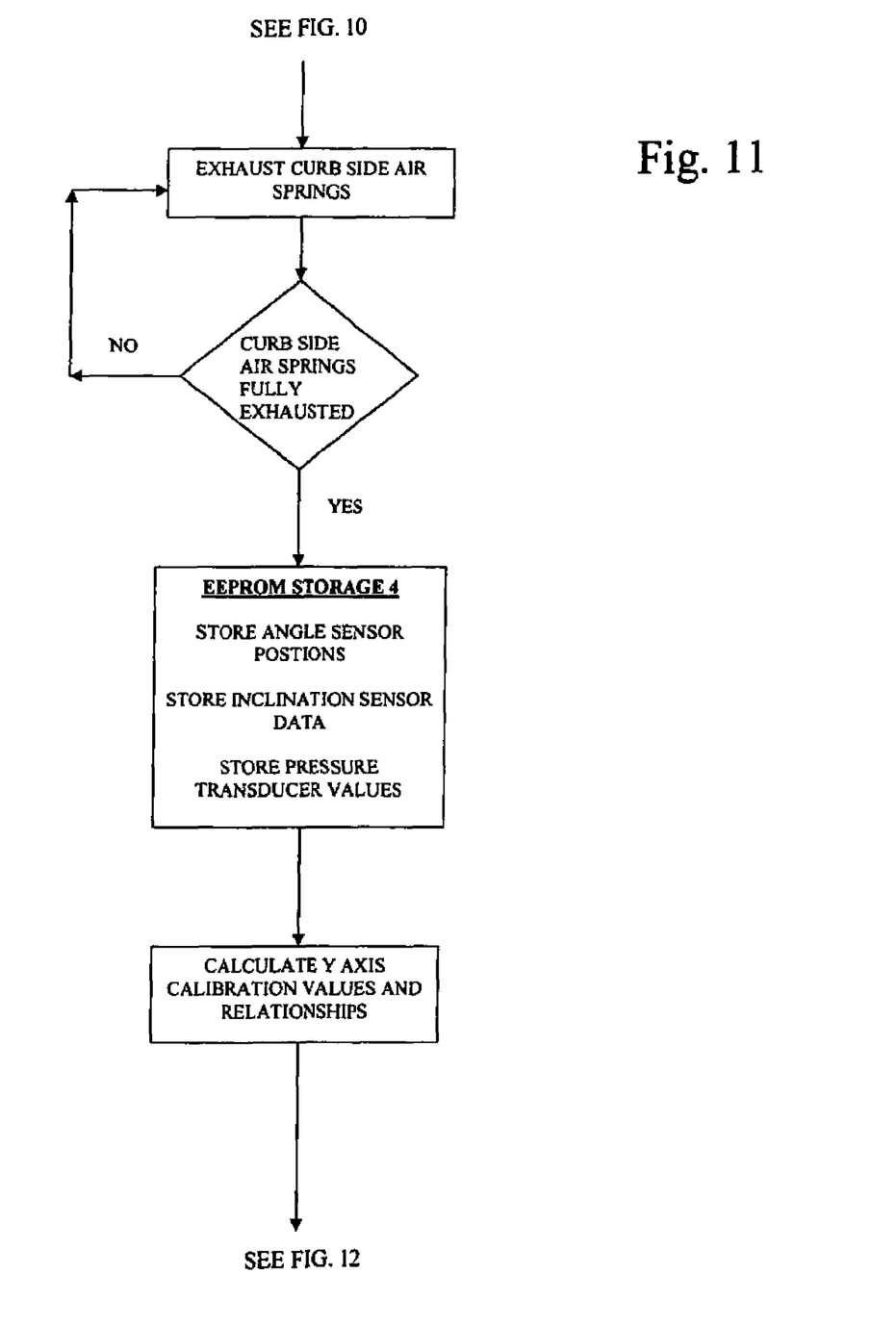
Figure 12:
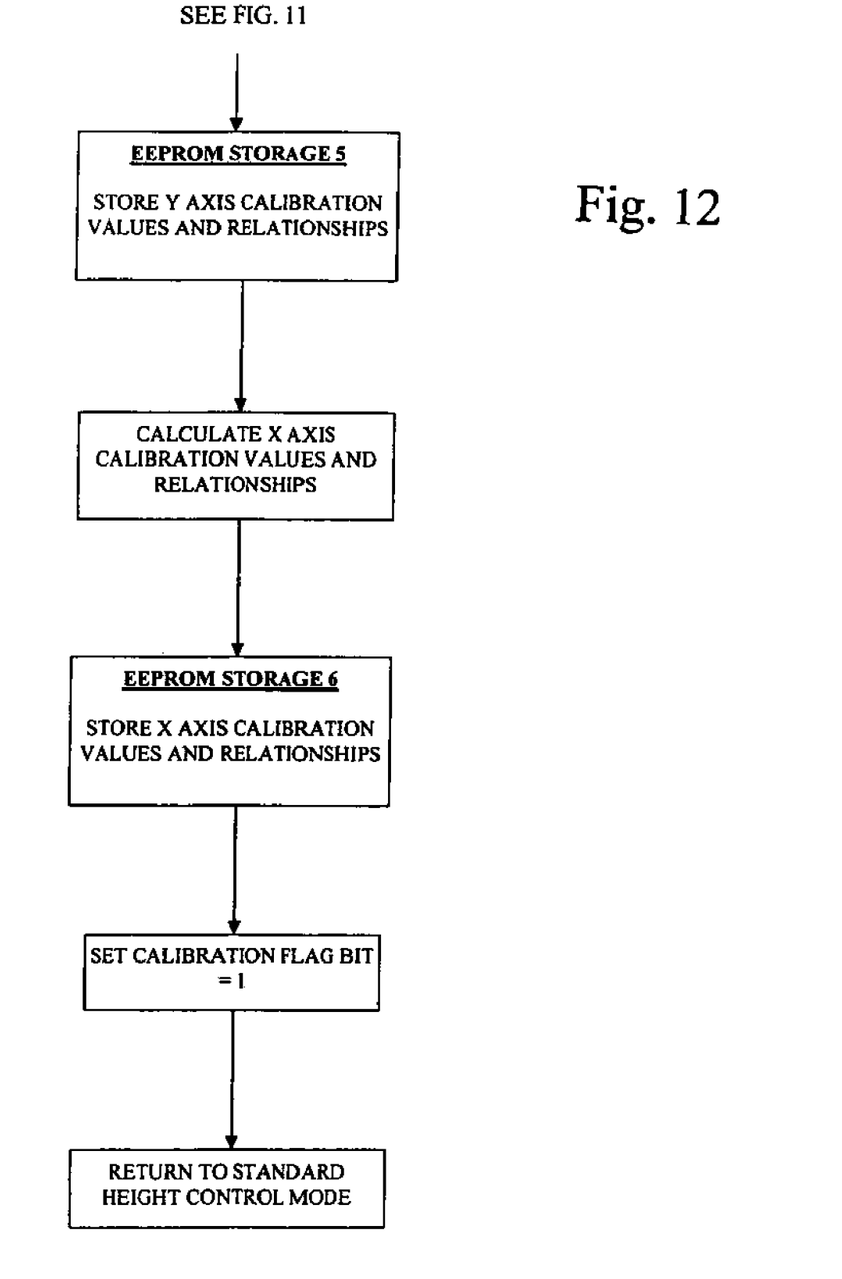

With reference to FIG. 7, after the axis is leveled relative to the horizontal plane in step 1140, the controller notifies the operator in step 1150 of the level axis via the control panel by continuously illuminating green LEDs 54 and/or 56, depending on the axis leveled. The process is then exited, however, the above leveling mode may be repeated for all vehicle axes, to the extent that the system is able to level those axes. Thus, after exiting for one axis, the controller may repeat the steps again for another axis, beginning at step 1100 in FIG. 7.

With further reference to FIG. 7, in the alternative, if after step 1120, it is determined in step 1122 that the system is outside of adjustment range, i.e., that given the ride height adjustments available, it is impossible to level the vehicle axes relative to a horizontal plane, the controller will level the vehicle axes relative to the plane to the best extent that it can. For example, it will level the side to side axis the best that it can given the available articulation of the frame using the adjustment provided by the suspension elements. The resulting difference in angle between the horizontal or other plane, and the plane in which the axis is adjusted to, is referred to as a tolerance. The controller performs these adjustments to the suspension elements using any of the techniques described above. After the controller 30 has performed the adjustments via the ride height control system, it outputs signals in step 1025 to the control 50 to notify that the best adjustment that the system is capable of has been made, and that to completely level the axis or axes relative to the horizontal plane, the vehicle would have to be moved to another location. In the embodiment shown in FIG. 4, it does this by illuminating the respective red LED(s) 52 and/or 58 continuously. The process is then exited, however, it is noted that the above leveling mode may be repeated for all vehicle axes, to the extent that the system is able to level those axes. Thus, after exiting for one axis, the controller may repeat the steps again for another axis, beginning at step 1100 in FIG. 7.

A safety feature may be included in the self leveling mode. The controller 30 may be in communication with another input, for example, a vehicle speed sensor. The controller 30 may be programmed to automatically revert to the standard ride height control mode upon the input of a pre-selected parameter. For example, if the vehicle exceeds 15 miles per hour, the controller 30 will terminate operations under the self leveling mode, and switch to the standard leveling mode so that the ride height control system can function under its own control. This feature serves as a safety mechanism in situations where the operator forgets to reset the control switch 53 to the standard ride height control mode.

Another operational feature may be incorporated into the level search and level find modes, particularly where the controller operates first in a passive mode first to level the vehicle axes to a plane, i.e., the controller dumps air from the suspension elements to effect leveling. In this feature, as soon as the controller initiates the sub-modes, it analyzes pressure sensor data from an air supply sensor (not shown) to determine if there is sufficient air pressure available from the system's supply reservoir to enable the leveling system to operate normally. Additionally or alternatively, the pressure in the suspension elements may be measured with a pressure sensor (not shown). If the controller determines that the air pressure is insufficient to allow proper leveling to occur, the controller outputs this to the operator by causing the control panel LEDs to blink in a specific pattern. The operator corrects this situation by allowing the vehicle to replenish the pressure in the vehicle's supply reservoir(s), and the ride height control system suspension elements and starting the leveling process again. The pressure in the suspension elements can be monitored with one or more pressure sensors depending on application. One sensor can be used to save costs by using various switching methods.

III. Calibration

The leveling system 10 of the present invention is calibrated to the capabilities of the ride height control system so that system can determine whether vehicle can be leveled along an axis, i.e., if the suspension elements can be inflated/deflated enough to level the vehicle. Such calibration is usually performed at the factory upon installation of the leveling system on the vehicle. The calibration process may be carried out as set forth below and/or in the calibration routine flowchart in FIGS. 8-12, which corresponds to the steps described below.

The vehicle is first parked on a level surface to properly calibrate the vehicle. Referring to FIG. 3, in another step, a control signal to the electronic controller 30 initiates calibration. This control signal may be manually input with a calibration control panel that interfaces with the controller 30. The system reservoir pressure is measured before calibration begins to determine if proper leveling and calibration are possible. In another step, the vehicle front air springs 112, 113 are exhausted (lowered) and the rear air springs 114, 115 are fully extended. The angle sensor values (e.g., ride height data), vehicle inclination sensor values, and air spring pressures are measured with the position sensors 312-315 and inclination sensors 20, 22 and stored in the controller memory, for example, the EEPROM STORAGE 1 shown in FIG. 8. With this done, the vehicle rear air springs 114, 115 are exhausted (lowered) and the front air springs 112, 113 fully extended. The angle sensor values, vehicle inclination sensor values, and air spring pressures are measured as above and stored in the controller 30 memory, for example, the EEPROM STORAGE 2 shown in FIG. 9.

In another step, the vehicle driver side air springs 112,114 are exhausted (lowered) and the opposite side air springs 113,115 fully raised. The angle sensor values, vehicle inclination sensor values, and air spring pressures are measured and stored in the controller 30 memory, for example, the EEPROM STORAGE 3 shown in FIG. 10. With this done, the vehicle driver side air springs 112, 114 are fully raised and the opposite side air springs exhausted (lowered). The angle sensor values, vehicle inclination sensor values, and air spring pressures are measured and stored in the controller 30 memory, for example, the EEPROM STORAGE 4 shown in FIG. 11.

Based on the above articulation of the vehicle, the Y axis (front to back) calibration values are used to determine the mathematical relationship between the angle sensors located at the front air springs and rear air springs and the Y axis inclination sensor. This mathematical value is stored in the controller memory, for example, the EEPROM STORAGE 5 shown in FIG. 12. Additionally, the X axis (side to side) calibration values are used to determine the mathematical relationship between the angle sensors located at the driver side air springs and opposite side air springs and the X axis inclination sensor. This mathematical value is stored in the controller memory, for example, the EEPROM STORAGE 6 shown in FIG. 12.

The stored calibration values and stored mathematical relationships are used during the level search process to validate (predict) whether the system will be capable of leveling the vehicle from the current height position of the vehicle. The stored calibration values and stored mathematical relationships are also used during the actual leveling process to predict the best leveling strategy to use to level the vehicle based on the current height position of the vehicle.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention claimed is:

1. A process of leveling a vehicle including an electronic ride height control system in communication with a plurality of air springs secured between at least one vehicle axle and at least one vehicle frame element comprising:
   measuring a first angle of a first vehicle axis and a second angle of a second vehicle axis relative to a horizontal plane;
   communicating information relating to the first and second angles to a controller;
   processing the information with the controller to generate leveling instructions; and
   automatically adjusting at least one of the air springs via the electronic ride height control system based on the leveling instructions to alter a distance between the vehicle axle and the vehicle frame element, wherein at least one of the first angle of the first vehicle axis and the second angle of the second vehicle axis relative to the horizontal plane is changed,
   wherein the automatically adjusting step includes only dumping air from the at least one air spring, whereby at least one of the first vehicle axis and the second vehicle axis is at least one of leveled relative to the horizontal plane and brought closer to being leveled relative to the horizontal plane.

2. The process of claim 1 wherein the controller at least one of controls and overrides the electronic height control system in said adjusting step.

3. The process of claim 1 wherein the vehicle axis is at least one of a side to side axis of the vehicle and a fore to aft axis of the vehicle.

4. A process of leveling a vehicle including an electronic ride height control system in communication with a plurality of fluid suspension elements, comprising:
   measuring a first angle of a first vehicle axis and a second angle of a second vehicle axis relative to a horizontal plane;
   communicating information relating to the first and second angles to a controller;
   processing the information with the controller to generate leveling instructions;
   automatically adjusting at least one of the fluid suspension elements via the electronic ride height control system based on the leveling instructions, wherein at least one of the first angle of the first vehicle axis and the second angle of the second vehicle axis relative to the horizontal plane is changed,
   wherein said automatically adjusting step is performed by dumping fluid from, but without adding fluid to, the at least one of the fluid suspension elements until at least one of the first vehicle axis and the second vehicle axis is at least one of leveled relative to the horizontal plane and brought closer to being leveled relative to the horizontal plane; and
   outputting the information to an operator via at least one of a display and an audible indicator.

5. A process of leveling a vehicle including an electronic ride height control system in communication with a plurality of fluid suspension elements, comprising:
   measuring a first angle of a first vehicle axis and a second angle of a second vehicle axis relative to a horizontal plane;
   communicating information relating to the first and second angles to a controller;

processing the information with the controller to generate leveling instructions;

automatically adjusting at least one of the fluid suspension elements via the electronic ride height control system based on the leveling instructions, wherein at least one of the first angle of the first vehicle axis and the second angle of the second vehicle axis relative to the horizontal plane is changed, wherein said automatically adjusting step is performed by dumping fluid from, but without adding fluid to, the at least one of the fluid suspension elements until at least one of the first vehicle axis and the second vehicle axis is at least one of leveled relative to the horizontal plane and brought closer to being leveled relative to the horizontal plane; and outputting the information to an operator to inform the operator of at least one of whether or not the first vehicle axis is level relative to the horizontal plane, whether or not the first vehicle axis is being leveled relative to the horizontal plane, whether or not the first vehicle axis is within a range of potential angles that will enable the first vehicle axis to be leveled relative to the horizontal plane, and whether or not the first vehicle axis is leveled to a tolerance relative to the horizontal plane.

6. A system for leveling a vehicle having an existing electronic ride height control system in communication with a plurality of air springs, at least one air spring positioned between at least one axle and at least one vehicle frame element, comprising:

a sensor that measures orientations of at least two vehicle axes relative to a horizontal plane; and a controller in communication with the sensor that processes information relating to the orientations and that generates leveling instructions based on the information, the controller operable in a self leveling mode, wherein the controller is enabled to automatically adjust, via substantially only deflation of at least one of the air springs via the electronic ride height control system based on the leveling instructions, wherein the orientation of at least one of the at least two vehicle axes relative to the horizontal plane is changed, and a standard leveling mode, wherein the controller is incapable of automatically adjusting at least one of the air springs via the electronic ride height control, so that the electronic ride height control can operate without being controlled by the controller.

7. The system of claim 6 wherein the controller is an electronic control unit, and wherein the measuring means is at least one leveling sensor.

8. The system of claim 7 wherein the controller adjusts the at least one of the plurality of suspension elements so that the vehicle axis is at least one of leveled relative to the horizontal plane and brought closer to being leveled relative to the horizontal plane.

9. The system of claim 8 wherein the controller is in communication with the electronic ride height control system, and wherein the controller at least one of controls and overrides the electronic ride height control system in said self leveling mode.

* * * * *